(12) United States Patent
Buechi et al.

(10) Patent No.: US 12,537,207 B2
(45) Date of Patent: Jan. 27, 2026

(54) POROUS TRANSPORT LAYER BASED ON MULTIPLE MICRO AND NANO SINTERED POROUS LAYERS

(71) Applicant: Paul Scherrer Institut, Villigen PSI (CH)

(72) Inventors: Felix Buechi, Langenthal (CH); Tobias Schuler, Turgi (CH)

(73) Assignee: Paul Scherrer Institut, Villigen PSI (CH)

( * ) Notice: Subject to any disclaimer, the term of this patent is extended or adjusted under 35 U.S.C. 154(b) by 1223 days.

(21) Appl. No.: 17/425,447

(22) PCT Filed: Jan. 14, 2020

(86) PCT No.: PCT/EP2020/050805
§ 371 (c)(1),
(2) Date: Jul. 23, 2021

(87) PCT Pub. No.: WO2020/151997
PCT Pub. Date: Jul. 30, 2020

(65) Prior Publication Data
US 2022/0085390 A1    Mar. 17, 2022

(30) Foreign Application Priority Data
Jan. 23, 2019 (EP) .................... 19153307

(51) Int. Cl.
*H01M 8/0245* (2016.01)
*H01M 8/0232* (2016.01)
*H01M 8/10* (2016.01)

(52) U.S. Cl.
CPC ....... *H01M 8/0245* (2013.01); *H01M 8/0232* (2013.01); *H01M 2008/1095* (2013.01)

(58) Field of Classification Search
None
See application file for complete search history.

(56) References Cited

U.S. PATENT DOCUMENTS

| 11,554,415 B2 | 1/2023 | Goto et al. |
| 2004/0137209 A1 | 7/2004 | Zeller et al. |

(Continued)

FOREIGN PATENT DOCUMENTS

| DE | 102015111918 A1 | 1/2017 |
| EP | 1361010 A1 | 11/2003 |

(Continued)

OTHER PUBLICATIONS

JP2006028616A Translation from Espacenet (Year: 2006).*

(Continued)

*Primary Examiner* — Nathanael T Zemui
(74) *Attorney, Agent, or Firm* — Laurence A. Greenberg; Werner H. Stemer; Ralph E. Locher

(57) ABSTRACT

A porous transport layer has a plurality of sintered porous layers with a permeability for gaseous and liquid substances. The multilayer porous transport layer is assembled between a bipolar plate and a catalyst layer of an electrochemical cell. A first and second porous layer have irregularly shaped particles of a conductive material. The mean particle size decreases from layer to layer from the bipolar plate towards the catalyst layer, and the irregularly shape particles are defined by having an irregularity parameter IP=D/d smaller than 5 and a roundness RN=P2/4πA greater than 1.2. D is the diameter of the smallest possible circle surrounding a 2D projection of the particle; d is the diameter of the biggest possible circle laying completely inside the 2D projection of the particle; P is the perimeter of the 2D projection of the particle; and A is the area of the 2D projection of the particle.

11 Claims, 2 Drawing Sheets

(56) References Cited

U.S. PATENT DOCUMENTS

| | | | |
|---|---|---|---|
| 2006/0105159 A1 | 5/2006 | O'Hara et al. | |
| 2007/0243452 A1* | 10/2007 | Weidman | H01M 8/0236 429/514 |
| 2012/0186976 A1* | 7/2012 | Laucournet | H01M 8/0243 204/252 |
| 2013/0295489 A1* | 11/2013 | Kim | H01M 4/8605 264/105 |
| 2018/0233758 A1 | 8/2018 | Schmidt et al. | |
| 2021/0066723 A1* | 3/2021 | Hayakawa | H01M 4/803 |
| 2021/0114099 A1 | 4/2021 | Goto et al. | |

FOREIGN PATENT DOCUMENTS

| | | | |
|---|---|---|---|
| EP | 1857573 | A1 | 11/2007 |
| EP | 3914754 | B1 | 9/2023 |
| JP | 2001279481 | A | 10/2001 |
| JP | 2006028616 | A * | 2/2006 |
| JP | 2010053400 | A | 3/2010 |
| WO | 2006034086 | A1 | 3/2006 |
| WO | 2013188568 | A1 | 12/2013 |
| WO | 2019181684 | A1 | 9/2019 |
| WO | 2019188480 | A1 | 10/2019 |

OTHER PUBLICATIONS

Database WPI; Week 201020; Thomson Scientific; London; GB: AN 2010-C56359; XP002792870; & JP 2010 053400 A (Honda Motor Co Ltd).

Qian et al., Sintering of Advanced Materials; p. 324-351, Woodhead Publishing, 2010.

Qian et al., Titanium Powder Metallurgy, chapter 7, Titanium powders from the hydride-dehydride process, p. 100-115, Elsevier Inc, 2015.

Bühler et al., Optimization of anodic porous transport electrodes for proton exchange membrane water electrolyzers, Journal of Materials Chemistry A, 2019, 2019, pp. 26984-26995, vol. 7, Publisher: Royal Society of Chemistry, DOI: 10.1039/c9ta08396k.

Suermann et al., Influence of Operating Conditions and Material Properties on the Mass Transport Losses of Polymer Electrolyte Water Electrolysis, Journal of The Electrochemical Society, 2017, pp. F973-F980, vol. 164, issue 9, Publisher: ECS (The Electrochemical Society), DOI: 10.1149/2.1351710jes.

Kumar Process Consultants and Chemicals Pvt. Ltd, Sintered Porous Metal Filters for Green Hydrogen Production Via PEM Electrolyzers, Company Website/Promotional Material, https://kumarfilter.com/blog/sintered-porous-metal-filters-for-green-hydrogen-production, May 9, 2025.

* cited by examiner

"POROUS TRANSPORT LAYER BASED ON MULTIPLE MICRO AND NANO SINTERED POROUS LAYERS"

BACKGROUND OF THE INVENTION

Field of the Invention

The present invention relates to a porous transport layer (PTL) for an electrochemical apparatus with stacked components and solid electrolyte.

Electrochemical apparatus with stacked components as polymer electrolyte water electrolysis (PEWE) and polymer electrolyte fuel cell (PEFC) are considered as electrochemical devices e.g. splitting water into the gaseous products oxygen and hydrogen or producing power from hydrogen and oxygen containing gases. The electrochemical components are based on a protonic conducting polymer membrane, anodic and cathodic catalyst layers as well as porous transport layers (PTL) allowing the fluids/gases to circulate towards the polymer membrane. Usually, said porous transport layers are sandwiched between the bipolar plate and the anodic catalyst layer on one side of the polymer membrane and/or between the bipolar plate and the cathodic catalyst layer on the other side of the polymer membrane.

In PEWE porous transport layers are key components, providing thermal and electrical conductivity and facilitating two phase flow between the catalyst layer and the flow field in a bipolar plate. To ensure electrochemical stability during operation (voltages between open circuit voltage and 3 V), valve metals, preferentially titanium preferred over carbon based materials for PTLs and bipolar plates due to their electrochemical inertness, are suitable materials. The efficiency of a system is highly affected by the properties of the porous transport layers further they govern the fluid and thermal management between the catalyst layer and the flow field channels in the bipolar plates. The fluid transport in PTLs is known to be capillary pressure driven. Gas path ways are established for broad range of current densities from 0.1 up to 2.5 A/cm$^2$. The surface properties influence the 2-phase transport in the porous titanium structures.

Conventional class of single layer porous transport layers (SL-PTLs) features poor mechanical and electrochemically relevant surface properties. High surface roughness in combination with low interfacial contact area between the porous transport layer and the catalyst layer result in significant local plastic deformation of the catalyst layer and the membrane and can subsequently induce catalyst layer cracking and membrane thinning.

Modified PTL surfaces by plasma spray coating do not significantly improve mechanical properties with respect to membrane and catalyst layer deformation. Also the efficiency with respect to the ohmic resistances and the kinetic over-potential are not improved at the same time and the modified materials are therefore not able to outperform state of the art sinter materials.

Efficiency is the key property in PEW, as operation cost typically represents up to 70% of the system life time costs. Further, the use of Ti as material for PTLs and bipolar plates results in substantial investment cost. Additional mechanical machining of Ti based bipolar plates for flow fields has a large contribution to the stack costs. It is therefore the objective of the present invention to provide a class of highly efficient porous transport layers that shows an increase in the system efficiency as well as superior durability eliminating membrane and catalyst layer deformation and cost reduction for bipolar plate machining.

SUMMARY OF THE INVENTION

This objective is achieved according to the present invention by a porous transport layer based on a plurality of sintered porous layers having a permeability for gaseous and liquid substances in an electrochemical cell; said multilayer porous transport layer being suited to be assembled between a bipolar plate and a catalyst layer, comprising:
  a) at least a first porous layer and a second porous layer comprising irregularly shaped particles of a conductive material, wherein the mean particle size decreases from layer to layer in a direction seen from the bipolar plate towards the catalyst layer, and wherein the irregularly shaped particles are defined by having an irregularity parameter IP=D/d smaller than 5 and a roundness RN=P$^2$/4$\pi$A greater than 1.2, wherein:
    i) D is the diameter of the smallest possible circle surrounding a 2D projection of the particle;
    ii) d is the diameter of the biggest possible circle laying completely inside the 2D projection of the particle;
    iii) P is the perimeter of the 2D projection of the particle; and
    iv) A is the area of the 2D projection of the particle; and
  b) the first and the second layer are made from sintered irregularly shaped particles of the conductive material, wherein the first porous layer having a contact surface enabled to be oriented towards the catalyst layer and polymer membrane has a smaller mean particle size than the second porous layer having a contact surface enabled to be oriented towards the bipolar plate.

The use of multilayer designed porous transport structures, comprised of a plurality of porous layers in optional combination with integrated flow field structures provides simultaneously economic and technical improvement by the optimization of a single component design.

Irregularly shaped particles as material for the PTL bulk structure are key to enable an efficient mass transport due to their intrinsically broad pore size distribution, as well as a high mechanical stiffness and a high thermal conductivity. Continuous gaseous pathways, in contrast to discontinuous gas fingering can be obtained due to broad pore and particle size distribution (PSD). Water and gas are transported in counter-flow through the pore matrix. The use of non-spherical shaped particles provides certain advantages over spherical particles. Besides high mechanical strength, improved thermal and electrical conductivities are obtained. The irregularity of the particles can be defined by the Irregularity Parameter IP and the Roundness RN as defined above. These parameters and examples of particles have been described in more detail by Valdek MIKLI et al. in the article "Characterization of powder particle morphology" in Proc. Estonian Acad. Sci. Eng., 2001, 7, 1, pages 22 to 34.

Preferably, the first porous layer may have a mean particle size from below 1 µm to 25 µm and/or the second porous layer, labeled support layer, has a mean particle size in the range from 10 to 500 µm.

Suitably, the first porous layer has a thickness in the range from 10 to 300 µm and the second porous layer has a thickness in the range from 0.1 to 4 mm.

In a preferred embodiment of the present invention the conductive material is titanium and/or stainless steel having a protective layer.

In order to suppress growing of a highly ohmic resistant Ti oxide layer as well as the degradation of the porous transport layer, the first porous layer and/or the second porous layer may comprise at least partially a protective coating comprising an alloy or an inert metal, preferably one of or a combination of Au, Pt and Ir, preferably having a thickness in the range from 0.02 to 2 μm.

In order to provide a certain flexibility in the design of the PTL decreasing mean particle size from layer to layer, at least one additional micro-porous layer/nano-porous layer (MPL/NPL) is disposed on the second porous layer; said second porous layer having a mean particle size bigger than the additional porous layer.

In order to optimize the flow path for the gaseous and liquid fluids from and/or to the catalyst layer, flow channels can be integrated in the second layer, said support layer comprising a number of integrated flow channels; said integrated flow channels preferably having a height and a width in the range from 0.1 to 5 mm.

BRIEF DESCRIPTION OF THE SEVERAL VIEWS OF THE DRAWING

Preferred embodiments of the present invention are hereinafter described in more detail with reference to the attached drawings which depict in.

DETAILED DESCRIPTION OF THE INVENTION

The present invention relates to a multilayer porous transport layer (ML-PTL) based on single/multiple sintered micro- and/or nano-porous layers (MPL/NPL) on a porous support layer as well as integrated flow fields for an electrochemical apparatus with stacked components and solid electrolyte.

Further, the suitable surface properties of the ML-PTLs are sustained by the sintering process of irregular shaped particles where spray coating according to the prior art promotes hydrophobicity of the surface. Interfacial contact area properties between single layer as well as surface modified PTLs and catalyst layers as well as bulk properties are not optimized by this procedure. Dense plasma spray coated layers form a rough sharp silhouette around support particles rather than smoothing the surface of the PTLs.

Figure 1:
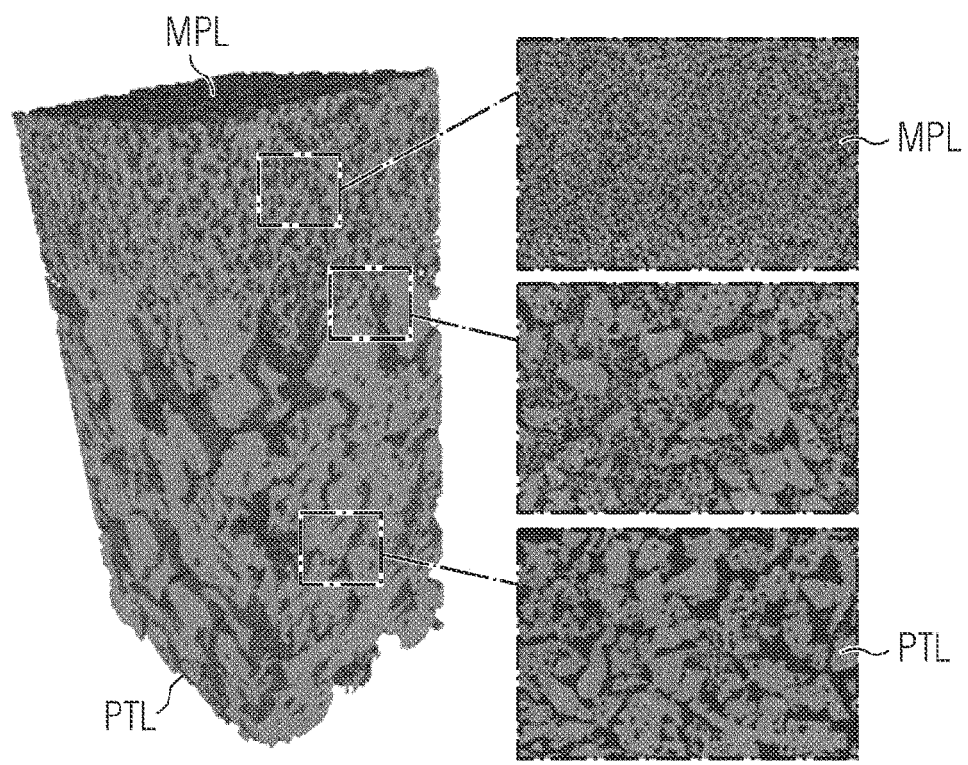
FIG. 1 X-ray tomographic microscopy of a multilayer porous transport layer (ML-PTL) using one additional microporous layer on a support layer.

FIG. 1 exemplarily depicts a ML-PTL combination using a single MPL layer as this is not common knowledge according to the prior art. Conventional single layer porous transport layer features poor mechanical and electrochemically relevant surface roughness properties. High surface roughness in combination with low interfacial contact area between the porous transport layer and the catalyst layer result in significant local plastic deformation of the catalyst layer and the membrane and can subsequently induce catalyst layer cracking and membrane thinning. Modified PTL surfaces by plasma spray coating don't affect the ohmic resistances or the kinetic over-potential simultaneously and are not able to outperform state of the art sinter materials.

The novel combination of irregularly shaped particles (see definition above) to form a multilayer sintered PTL covers all essential properties for a high efficient PTL for a PEWE.

Multilayer sintered porous transport layers are comprised of a support layer and at least one micro/nano-porous layer or multiple micro/nano-porous layers featuring gradient decrease in particle sizes. Preferential porosities of all layers were determined to be in the range of 30% to 60%. Typically, for the particles used in this example the Irregularity Parameter IP ranges from 1.5 to 4 and the Roundness ranges from 1.15 to 2.0.

Figure 2:
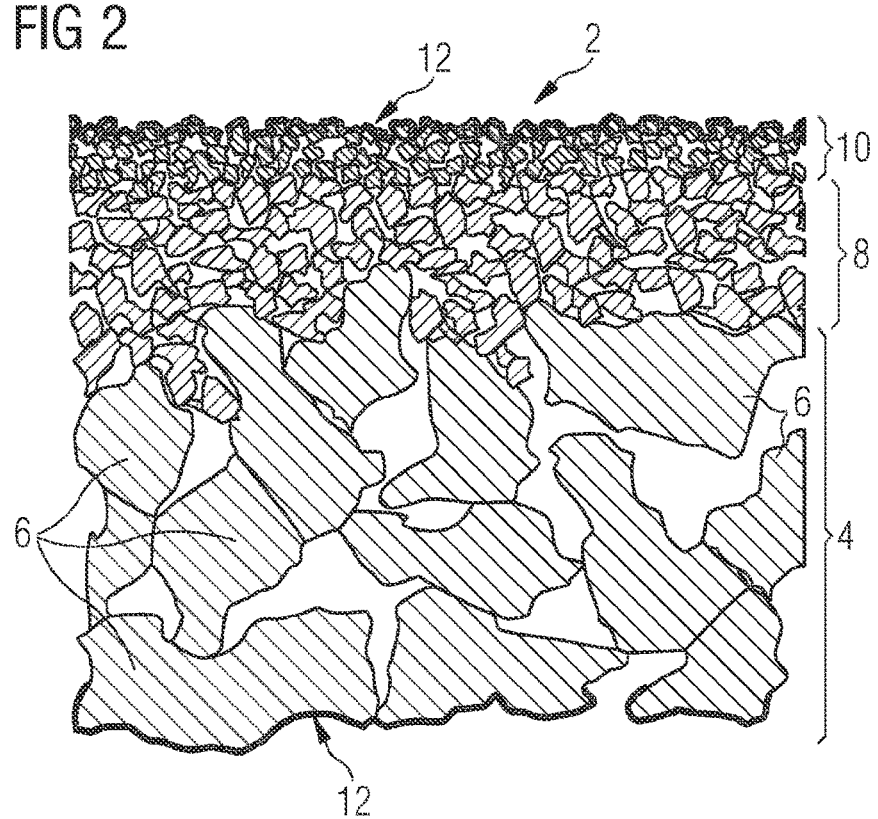
FIG. 2 a simplified cartoon of a three-layer porous transport layer configuration with corrosion protective layers at contact surfaces.

FIG. 2 exemplifies a multilayer PTL structure 2 based on a three-layer configuration. A support layer 4 shown in FIG. 2 features a preferential thickness of 4 mm down to 0.1 mm (here for example 0.4 mm) and is based on non-defined shaped particles 6 with sizes in the range of 10 μm to 500 μm, preferably 30 to 150 μm. Optionally, flow fields are embedded in this support layer 4 as discussed in the next section for FIGS. 3 and 4.

A significant decrease of the surface roughness is obtained by the application of multilayer sintering of micro-porous layer 8 and/or nano-porous layer 10 and porous support layer 4. Vacancies at the surface of any prior layer are filled gradually in chronological order from high to low solid mean particles sizes. Non-spherical micro-porous layer (MPL) particle sizes are preferentially in the range of 1-25 μm. MPL thicknesses feature a thickness of 10 μm-300 μm. High interfacial contact surfaces as well as smooth surface roughness are obtained by the multiple layer approach. Sintering of MPLs based on non-spherical particles enables sufficient open-porosity in the range of 25%-60% to sustain efficient fluid transport. Irregularity parameter IP and roundness RN ranges within the tolerances given above.

Surface properties of multilayer sintered porous transport layers are further optimized by nano-porous layers 10 (NPL) featuring non-defined shaped particle sizes between 0.3 and 1 μm. Ideal thickness of NPL is identified to be between 2 μm to 30 μm.

Complementary to NPL/MPLs, a final layer 12 of corrosion protective coating suppressing growing of highly ohmic resistant Ti oxide layers during PEWE operation is used optionally. In industry commonly used protective layers 12 are alloys and metals as Au, Pt and Ir. These thin final protective layers 12 with preferential thicknesses of 0.02 μm-2 μm are made by plasma spray coating or galvanization processes at the surface of final MPL 8 or NPL 10 and support layer 4. An economically and technically preferential coating penetration depth is below 50 μm. PEWE efficiency is dominated by the three losses associated to kinetics, electric/ionic conductivity and mass transport. All three losses are decreased simultaneously due to the superior surface properties of the sintered MPL/NPLs 8, 10 in contrast to selectively affecting spray coated layers. The high contact area and contact lines of the MPL/NPL induce higher utilization of the catalyst layer, lower ohmic interfacial contact resistances and suppress mass transport overpotential. Broad pore size distribution and open porosity of the ML-PTL ensure defined and efficient fluid transport in small and big pores of the MPL/NPL bulk for water and gas respectively. Said catalyst layers (not shown in FIG. 2) can be deposited on the protective layer 12 on the side of the nano porous layer 10. The catalyst layer is then sandwiched between the multilayer porous transport layer 2 and the polymer membrane of the PEWE. A bipolar plate (not shown in FIG. 2 can contact the protective layer 12 on the side of the porous support layer 4. The complete multilayer porous transport layer 2 is in an assembled electrochemical cell sandwiched between a catalyst layer on the membrane side and a bipolar plate on the opposite side.

Ohmic contact resistances as well as PTL surface passivation by Ti oxides can be further decreased by the corrosion resistant contact layer coatings 12 of Pt or Ir inhibiting locally formation and growing of Ti oxide layers at the interfaces between catalyst layer/PTL as well as bipolar plate/PTL.

Multiple layer sintering of gradient sized particles promotes homogenous temperature and pressure distribution at the interface ensuring lower hydrogen cross-over due to reduced mechanical stressors by the smooth MPL/NPL surface properties and high in-plane and through-plane conductivity values.

Efficiency of multi component apparatus as PEWE can further be improved by enabling the use of ultra-thin ion conductive membranes due to improved mechanical and topological MPL/NPL properties.

A novel concept of integrated flow channels in the support layer of the ML-PTL in combination with MPL/NPLs provides the possibility of controlled fluid dynamics by choice of different channel geometries. Additive manufacturing techniques as 3D printing or etching can be used in addition to common used mechanical machining of sinter mask negatives enabling high flexibility of flow field geometries.

Significant cost reduction for single step sinter manufacturing of flow-fields and PTL support as well as superior water management can be achieved.

Channels width and heights in the range of 0.3 mm-5 mm were identified to be optimal for fluid transport. Multiple channel geometries such as parallel and serpentine in combination with single and multiple sintered NPL/MPLs are shown in FIGS. 3 and 4.

Figure 3:
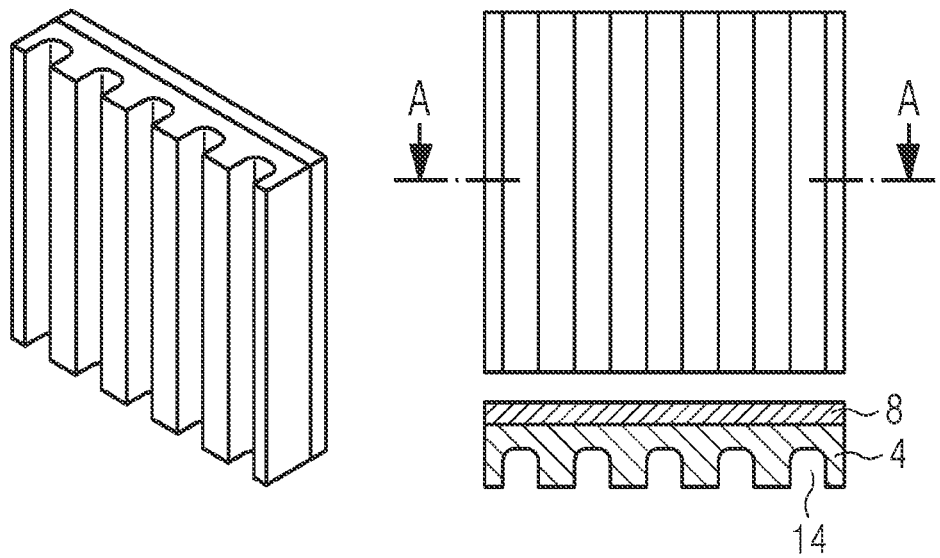
FIG. 3 schematically a multilayer porous transport layer configuration including parallel flow channels in a support layer.
Figure 4:
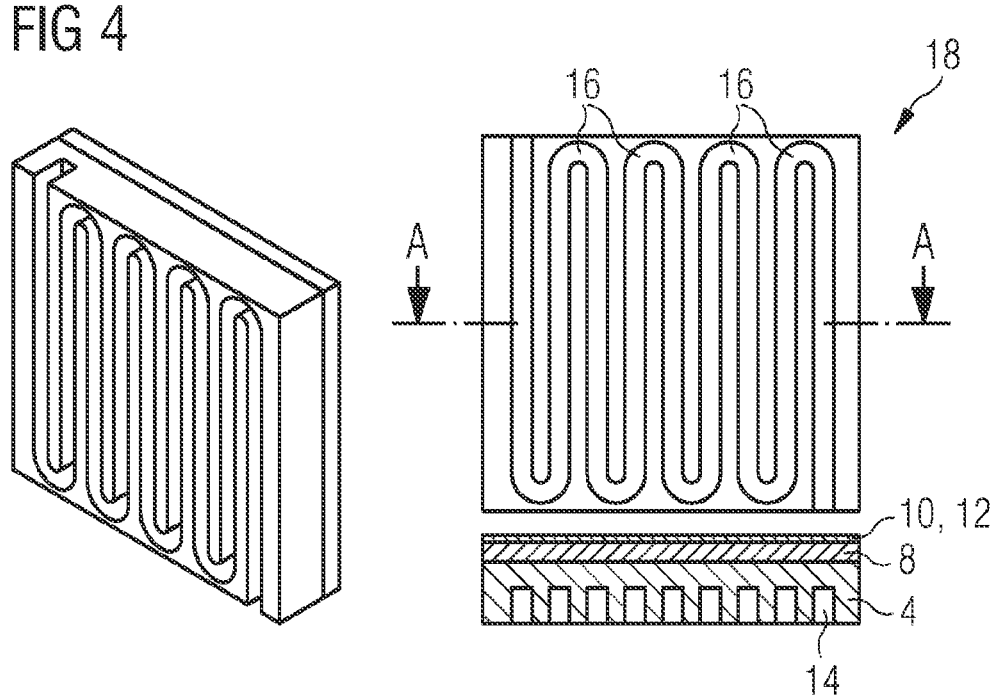
FIG. 4 schematically a serpentine flow field in a support layer combined with a multilayer porous transport layer.

FIG. 3 illustrates parallel flow field channels 14 embedded in the support layer 4 in combination with a single MPL 8. FIG. 4 schematically shows a multilayer porous transport layer 18 with a serpentine flow field 16 in the support layer 4 combined with a multilayer structure of MPL 8, as well as NPL 10, and a protective coating 12.

Manufacturing of the multilayer porous transport layer (ML-PTL) can be performed by the techno-economically established process of sintering providing precise control of process parameters, industrial production scale and flexibility in product geometry present. Irregular, spattered Ti powder, preferentially produced by the hydrogenation-dehydrogenation (HDH) process, can be used as feedstock for the sinter process.

A multiple layer structure can be achieved by coaxial pressing of multiple said irregularly spattered Ti powders where mean particle diameter decreases from layer to layer thereby multiple filling shoes can be used. Mechanical integrity and specific bulk properties of PTLs are obtained by a sintering process preferentially vacuum sintering. Conventional sintering parameters are vacuum pressure of $2 \times 10^{-3}$ Pa, temperatures between 1150° C. to 1300° C. and soaking times of 1 h to 3 h.

The invention claimed is:

1. A multilayer porous transport layer having a permeability for gaseous and liquid substances in an electrochemical cell, the multilayer porous transport layer being suited to be assembled between a bipolar plate and a catalyst layer of the electrochemical cell, the multilayer porous transport layer comprising:

a) at least a first porous layer and a second porous layer made up of sintered irregularly shaped particles of a conductive material, a mean particle size of said irregularly shaped particles decreasing from layer to layer in a direction seen from the bipolar plate towards the catalyst layer, and wherein the irregularly shape particles are defined by having an irregularity parameter IP=D/d smaller than 5 and a roundness RN=P2/4πA greater than 1.2 wherein:
   i) D is a diameter of a smallest possible circle surrounding a 2D projection of a particle;
   ii) d is a diameter of a biggest possible circle laying completely inside the 2D projection of the particle;
   iii) P is a perimeter of the 2D projection of the particle; and
   iv) A is an area of the 2D projection of the particle; and
 b) the first porous layer, containing a surface enabled to be oriented towards the catalyst layer, having a smaller mean particle size than the second porous layer having a surface enabled to be oriented towards the bipolar plate, the first porous layer being a nano-porous layer (NPL) made up of irregularly shaped particles having sizes between 0.3 and 1 µm.

2. The porous transport layer according to claim 1, wherein said second porous layer has a mean particle size in a range from 1 to 150 µm.

3. The porous transport layer according to claim 1, wherein said first porous layer has a thickness in a range from 2 to 300 µm and said second porous layer has a thickness in a range from 0.1 to 4 mm.

4. The porous transport layer according to claim 1, wherein said conductive material is titanium and/or stainless steel having a protective layer.

5. The porous transport layer according to claim 1, wherein said first porous layer and/or said second porous layer contains at least partially a protective coating containing an inert metal or alloy.

6. The porous transport layer according to claim 5, wherein said protective coating has a thickness in a range from 0.02 to 2 µm.

7. The porous transport layer according to claim 1, further comprising at least one third porous layer disposed between said first porous layer and said second porous layer, said third porous layer having a mean particle size bigger than said first porous layer and smaller than said second porous layer.

8. The porous transport layer according to claim 1, wherein said second porous layer contains a plurality of integrated flow channels.

9. The porous transport layer according to claim 8, wherein said integrated flow channels have a height and a width in a range from 0.1 to 5 mm.

10. The porous transport layer according to claim 5, wherein said inert metal or alloy is Au, Pt, Ir or a combination of Au, Pt and Ir.

11. The porous transport layer according to claim 1, wherein said NPL has a thickness in a range from 0.3 to 1 µm.

* * * * *